(12) United States Patent
Galbreath et al.

(10) Patent No.: US 8,528,984 B2
(45) Date of Patent: Sep. 10, 2013

(54) SEAT TRIM RETENTION CLIP

(75) Inventors: Ashford A. Galbreath, Troy, MI (US); Asad S. Ali, Troy, MI (US); Paul Severinski, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/452,080

(22) Filed: Apr. 20, 2012

(65) Prior Publication Data

US 2012/0216376 A1   Aug. 30, 2012

Related U.S. Application Data

(62) Division of application No. 12/574,027, filed on Oct. 6, 2009, now Pat. No. 8,197,010.

(60) Provisional application No. 61/199,003, filed on Nov. 12, 2008.

(51) Int. Cl.
*A47C 7/02* (2006.01)

(52) U.S. Cl.
USPC .......................................... 297/452.6; 24/297

(58) Field of Classification Search
USPC .......... 297/452.6, 218.2; 5/406, 407; 24/297
See application file for complete search history.

(56) References Cited

U.S. PATENT DOCUMENTS

| | | | | |
|---|---|---|---|---|
| 3,019,498 A | * | 2/1962 | Brown | 24/297 |
| 3,630,572 A | * | 12/1971 | Homier | 297/452.6 |
| 3,848,926 A | * | 11/1974 | Kuroishi | 297/452.53 |
| 3,961,823 A | * | 6/1976 | Caudill, Jr. | 297/452.6 |
| 5,548,929 A | * | 8/1996 | Larsen et al. | 49/441 |
| 5,605,373 A | * | 2/1997 | Wildern et al. | 297/218.4 |
| 5,641,552 A | | 6/1997 | Tillner | |
| 5,733,001 A | * | 3/1998 | Roberts | 297/218.1 |
| 5,820,213 A | | 10/1998 | Severinski | |
| 5,964,017 A | * | 10/1999 | Roberts | 29/91.1 |
| 5,971,478 A | | 10/1999 | Hurite | |
| 6,299,255 B1 | * | 10/2001 | Pichon | 297/452.6 |
| 6,568,761 B2 | | 5/2003 | Perske et al. | |
| 6,668,429 B2 | | 12/2003 | Fujisawa et al. | |
| 6,899,399 B2 | | 5/2005 | Ali et al. | |
| 7,114,221 B2 | * | 10/2006 | Gibbons et al. | 24/289 |
| 7,134,730 B2 | | 11/2006 | Flegal et al. | |
| 7,287,305 B2 | | 10/2007 | Bednarski | |
| 7,487,575 B2 | * | 2/2009 | Smith | 24/297 |
| 7,506,939 B2 | | 3/2009 | Brockschneider et al. | |
| 7,517,577 B2 | * | 4/2009 | Pedde et al. | 428/99 |
| 7,559,100 B2 | * | 7/2009 | Pedde et al. | 5/407 |
| 7,585,025 B2 | * | 9/2009 | Welch et al. | 297/218.2 |
| 7,815,992 B2 | * | 10/2010 | Pedde et al. | 428/100 |

(Continued)

FOREIGN PATENT DOCUMENTS

DE  7317520 U    3/1974
DE  69310593 T2  12/1997

(Continued)

*Primary Examiner* — David E Allred
(74) *Attorney, Agent, or Firm* — Brooks Kushman P.C.

(57) ABSTRACT

A retention clip for securing a trim cover. The retention clip may have first and second pads that may be spaced apart from each other and disposed on a first base axis. First and second arms may extend from the first pad. Third and fourth arms may extend from the second pad. A first and second extension arms may extend from the first arm to the third arm and from the second arm to the fourth arm, respectively.

20 Claims, 3 Drawing Sheets

(56) References Cited

U.S. PATENT DOCUMENTS

| | | | |
|---|---|---|---|
| 8,099,837 B2 * | 1/2012 | Santin et al. | 24/297 |
| 8,191,971 B2 * | 6/2012 | Lovasz | 297/452.6 |
| 2002/0101109 A1 * | 8/2002 | Stiller et al. | 297/452.6 |
| 2003/0001421 A1 | 1/2003 | Schmidt | |
| 2003/0215601 A1 * | 11/2003 | Pedde et al. | 428/102 |
| 2005/0006944 A1 * | 1/2005 | Ali et al. | 297/452.6 |
| 2008/0258523 A1 * | 10/2008 | Santin et al. | 297/218.2 |
| 2009/0085384 A1 * | 4/2009 | Galbreath et al. | 297/218.1 |
| 2009/0295215 A1 * | 12/2009 | Galbreath et al. | 297/452.6 |

FOREIGN PATENT DOCUMENTS

| | | |
|---|---|---|
| DE | 29821697 U1 | 2/1999 |
| DE | 20100848 U1 | 3/2001 |
| DE | 10019798 A1 | 11/2001 |
| DE | 202004017050 U1 | 1/2005 |
| DE | 202005008952 U1 | 6/2005 |
| DE | 202005013339 U1 | 11/2005 |
| DE | 102006020306 A1 | 11/2007 |
| DE | 102007037867 A1 | 6/2008 |
| DE | 102009046551 A1 * | 5/2010 |
| JP | 2691457 B2 | 12/1997 |
| WO | 0124665 A1 | 4/2001 |
| WO | 02054917 A2 | 7/2002 |
| WO | 2008017360 A1 | 2/2008 |

* cited by examiner

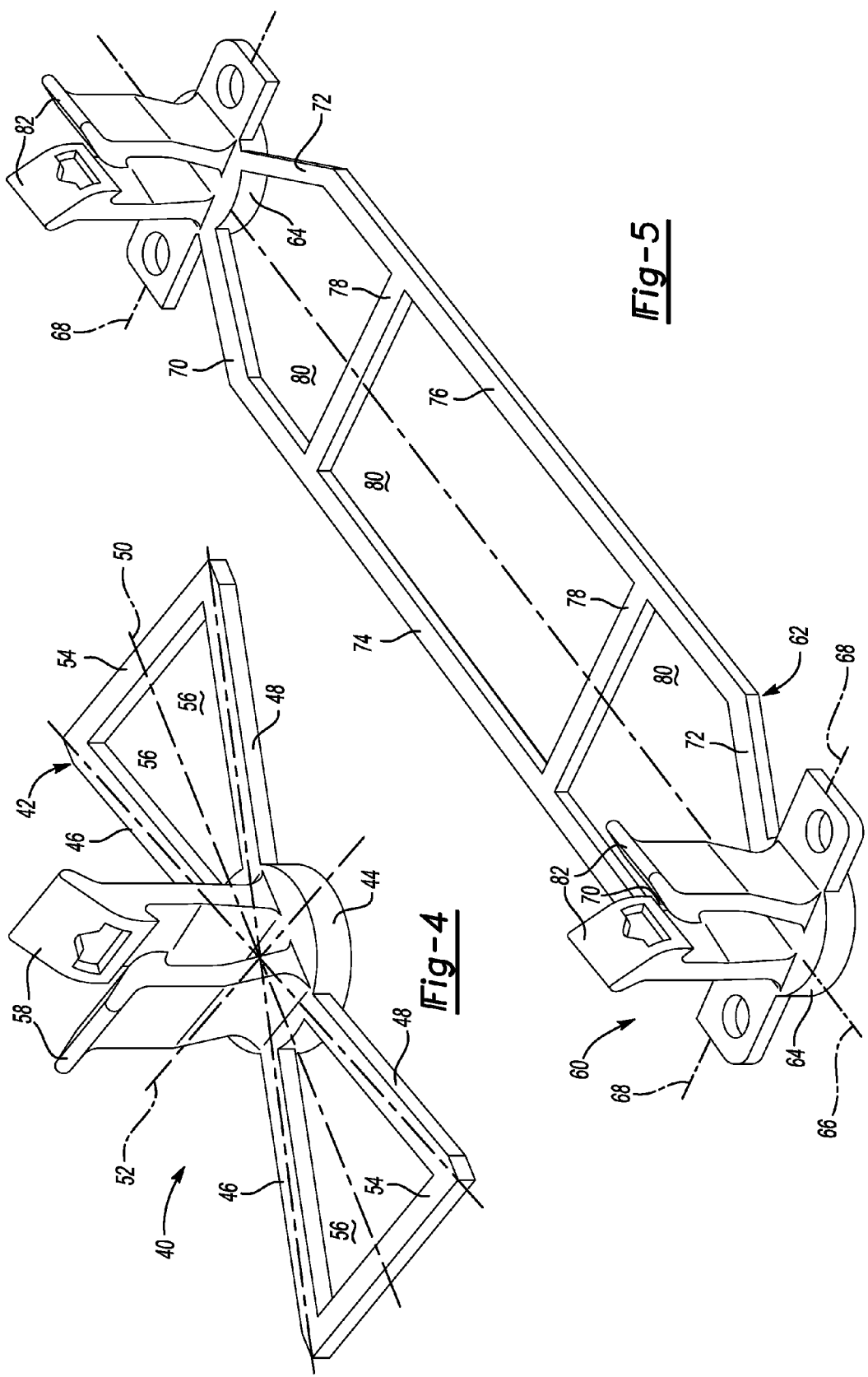

SEAT TRIM RETENTION CLIP

CROSS-REFERENCE TO RELATED APPLICATIONS

This application is a division of U.S. Pat. No. 8,197,010 filed Oct. 6, 2009, now U.S. Pat. No. 8,197,010 which, in turn, claims the benefit of U.S. provisional application Ser. No. 61/199,003 filed Nov. 12, 2008.

BACKGROUND OF THE INVENTION

Field of the Invention

This application relates to a retention clip that may be used to secure a trim cover.

SUMMARY OF THE INVENTION

In at least one embodiment, a retention clip for securing a trim cover is provided. The retention clip may include first and second pads that may be spaced apart from each other and disposed on a first base axis. The first and second pads may each have at least one trim cover retention feature. First and second arms may extend from the first pad at an acute angle with respect to the first base axis. Third and fourth arms may extend from the second pad at an acute angle with respect to the first base axis. A first extension arm may extend from the first arm to the third arm. A second extension arm may extend from the second arm to the fourth arm. The first, second, third, and fourth arms and the first and second extension arms may at least partially define at least one opening therebetween that is disposed on the first base axis.

In at least one embodiment, a seat trim cover retention clip is provided. The retention clip may include first and second pads that are spaced apart from each other and disposed on a first base axis. The first and second pads may each have a retention feature for securing a trim cover. First and second arms may extend from the first pad toward the second pad. Third and fourth arms may extend from the second pad toward the first pad. A first extension arm may extend from the first arm to the third arm. A second extension arm may extend from the second arm to the fourth arm. A first connecting member may be disposed between the first and second pads and extend across the first base axis from the first extension arm to the second extension arm.

BRIEF DESCRIPTION OF THE DRAWINGS

FIG. 4 is a perspective view of the retention clip shown in FIG. 2.

FIG. 5 is a perspective view of another embodiment of a retention clip.

DETAILED DESCRIPTION

Figure 1:
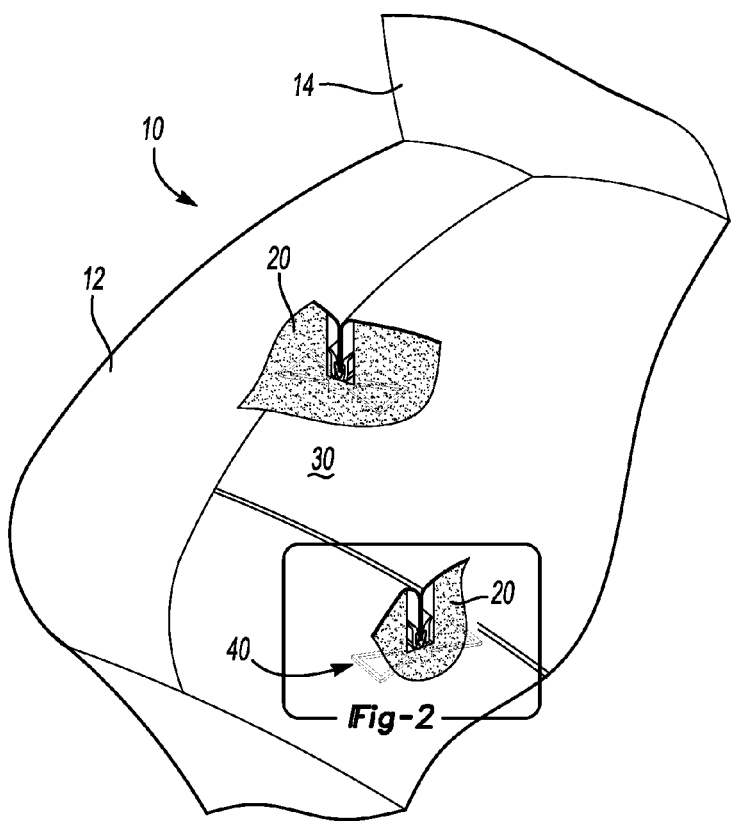
FIG. 1 is a fragmentary perspective view of a portion of a seat assembly.
Figure 2:
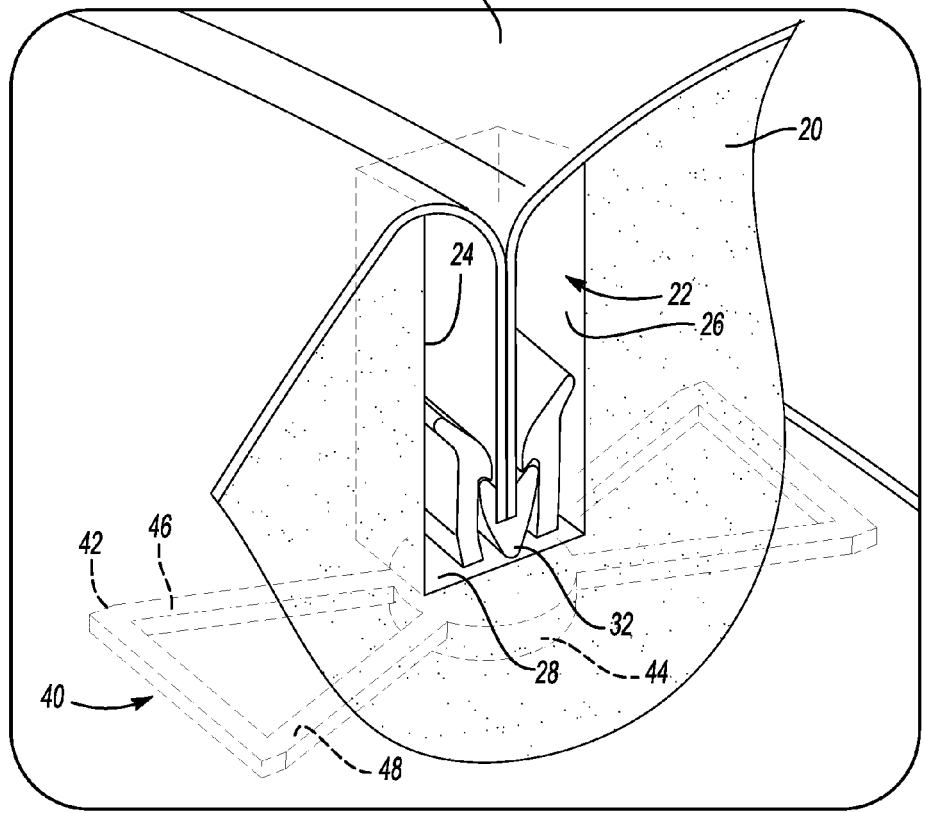
FIG. 2 is a magnified section view of the seat assembly having a trim cover assembly and a retention clip.

Referring to FIGS. 1 and 2, a portion of a seat assembly 10 is shown. The seat assembly 10 may be provided with a vehicle, such as a car or truck. In addition, the seat assembly 10 may be configured for non-vehicular applications.

The seat assembly 10 may include a seat bottom 12 and a seat back 14. In a vehicular application, the seat bottom 12 may be moveably disposed on a support surface. The seat back 14 may be pivotally disposed on the seat bottom 12 in a manner known by those skilled in the art. The seat bottom 12 and the seat back 14 may include a support structure, such as a seat frame, seat pan, and/or support wires.

A cushion 20 may be supported by the support structure. The cushion 20 may be made of any suitable material, such as foam. The cushion 20 may include at least one opening 22. The opening 22 may be a recess, such as a hole, trench, or elongated channel, that is provided in the cushion 20. The opening 22 may be at least partially defined by a plurality of surfaces. For instance, the opening 22 may be at least partially defined by first and second side surfaces 24, 26 and a bottom surface 28 that extends between the first and second side surfaces 24, 26 as is best shown in FIG. 2.

At least one trim cover assembly 30 may be provided with the seat assembly 10. The trim cover assembly 30 may be disposed over the cushion 20 and may comprise an exterior surface of the seat assembly 10 upon which a seat occupant may be disposed when in a seated position. The trim cover assembly 30 may include one or more trim panels that may be made of any suitable material, such as fabric, leather, vinyl, or combinations thereof.

The trim cover assembly 30 may also include at least one engagement feature 32. The engagement feature 32 may help secure the trim cover assembly 30 to the seat assembly 10 to hold the trim cover assembly 30 in a desired position and to inhibit folding, puckering, or wrinkling of the trim cover assembly 30 that may have an undesirable aesthetic appearance. The engagement feature 32 may have any suitable configuration, such as a male configuration, female configuration, or combinations thereof. In addition, the engagement feature 32 may be provided in any suitable location. For example, the engagement feature 32 may be provided proximate an end of one or more trim cover panels. The engagement feature 32 may be coupled to the trim cover assembly 30 in any suitable manner, such as with stitching or an adhesive. Moreover, the engagement feature 32 may be made of any suitable material, such as a polymeric material.

Figure 3:
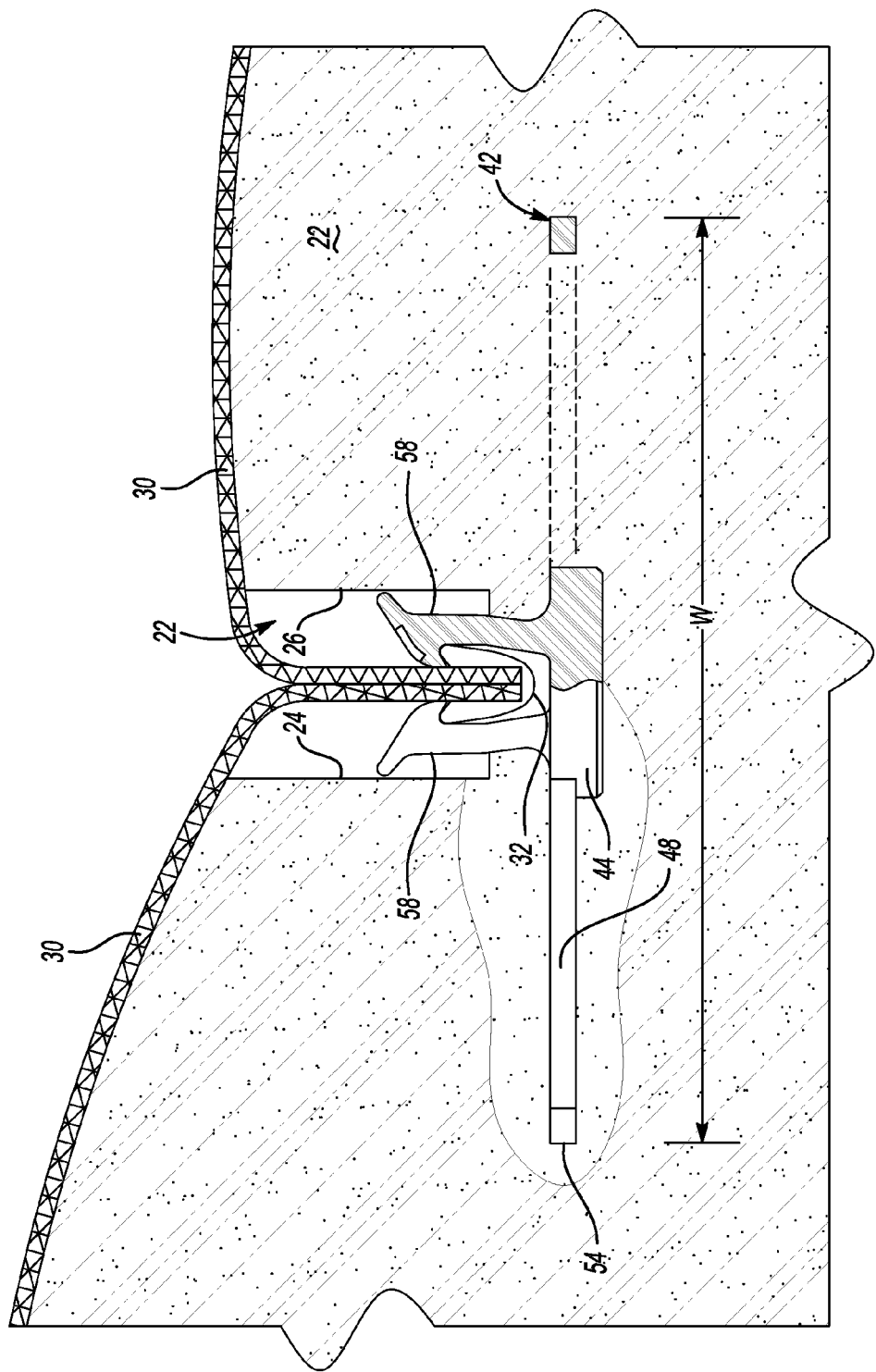
FIG. 3 is a fragmentary side section view of the retention clip shown in FIG. 2.

Referring to FIGS. 2-4, the seat assembly 10 may also include at least one retention clip 40. The retention clip 40 may be configured to engage one or more engagement features 32 to provide localized retention of the trim cover assembly 30. The retention clip 40 may be partially disposed in the cushion 20 and partially disposed in the opening 22 as will be discussed in more detail below.

The retention clip 40 may include a base 42. The base 42 may act as a footing and may be disposed in the cushion 20 and spaced apart from the opening 22. As such, the base 42 may distribute load forces and provide sufficient surface area to enhance bonding to the cushion 20 to inhibit dislocation or removal of the retention clip 40 from the cushion 20. The base 42 may include a pad 44 and first and second arms 46, 48 that extend from the pad 44. The first and second arms 46, 48 may be generally linear and may be disposed substantially coplanar with the pad 44. In addition, the first and second arms 46, 48 may be provided in pairs that may be provided on opposite sides of the pad 44. The first and second arms 46, 48 may be spaced apart from each other. The first and second arms 46, 48 may be provided at an angle, such as an acute angle, with respect to each other. In addition, the first and second arms 46, 48 may be provided at an angle with respect to first and second base axes 50, 52. The first and second base axes 50, 52 may be provided in a coplanar perpendicular relationship and may intersect at substantially the center of the pad 44. As such, the first and second base axes 50, 52 may substantially bisect the pad 44. In addition, the first and second arms 46, 48 may be oriented along axes that intersect at a point, such as at or near the center of the pad 44.

The first and second arms 46, 48 may be provided such that the base 42 is wider than the opening 22 in the cushion 20. For example, the base 42 may be provided with a width W that is greater than the width or distance between the first and second side surfaces 24, of the opening 22 as is best shown in FIG. 3.

A connecting member 54 may extend between the first and second arms 46, 48. In at least one embodiment, the connecting member 54 may be provided at distal ends of the first and second arms 46, 48. The connecting member 54 may be substantially linear, spaced apart from the pad 44, and disposed substantially coplanar with the first and second arms 46, 48. The connecting member 54 may help provide structural reinforcement and generally maintain the positioning of the first and second arms 46, 48 with respect to each other. In addition, the connecting member 54 may cooperate with the first and second arms 46, 48 to at least partially define a base opening 56 that may provide access for insertion of a tool through the retention clip 40 to engage and pull the trim cover assembly 30 toward and into engagement with the retention clip 40. As such, a majority of the base 42 of the retention clip 40 may be spaced apart from the first base axis 50.

One or more retention features 58 may be provided with the retention clip 40. The retention feature 58 may have any suitable configuration. In the embodiment shown, the retention feature 58 is configured as a pair of spaced apart barbs that extend from the pad 44. The barbs may be configured to flex away from each other to receive the engagement feature 32 in a snap-fit arrangement. The retention feature 58 may extend through the cushion 20 and into the opening 22 as is best shown in FIG. 3.

Referring to FIG. 5, another embodiment of a retention clip 60 is shown. The retention clip 60 may include a base 62 that may be disposed in the cushion 20. As with the previous embodiment, the base 62 may act as a footing and may be provided with a width that is greater than the width or distance between the first and second side surfaces 24, 26 of the opening 22.

The base 62 may include a plurality of pads 64 disposed along a first base axis 66. A second base axis 68 may be coplanar with and extend substantially perpendicular to the first base axis 66. First and second arms 70, 72 may extend from each pad 64. The first and second arms 70, 72 may be provided at an angle with respect to each other and with respect to the first base axis 66. The first and second arms 70, 72 may be oriented along axes that intersect at a point, such as at or near the center of a respective pad 64. In addition, the first and second arms 70, 72 may be substantially linear and spaced apart from each other.

First and second extension arms 74, 76 may also be provided with the base 62. The first extension arm 74 may extend between the first arms 70. The second extension arm 76 may extend between the second arms 72. The first and second extension arms 74, 76 may be substantially linear and may be substantially coplanar with the first and second arms 70, 72. In addition, the first and second extension arms 74, 76 may extend substantially parallel to each other and to the first base axis 66.

At least one connecting member 78 may extend between the first and second extension arms 74, 76 to provide structural reinforcement and generally maintain the positioning of the first and second extension arms 74, 76 with respect to each other. The connecting member 78 may be substantially linear and may intersect the first base axis 66 while being disposed substantially parallel to the second base axis 68. In addition, the connecting member 78 may cooperate with the first and second extension arms 74, 76 to at least partially define multiple base openings 80 that may provide access for insertion of a tool through the retention clip 60 to engage and pull the trim cover assembly 30 into engagement with the retention clip 60. In at least one embodiment, the base openings 80 may be disposed along and substantially centered on or bisected by the first base axis 66. As such, a majority of the base 62 of the retention clip 60 is spaced apart from the first base axis 66.

One or more retention features 82 may be provided with the retention clip 60. The retention feature 82 may have any suitable configuration. In the embodiment shown, the retention feature 82 is configured as a pair of barbs that extend from the pad 64. The barbs may be configured to flex away from each other to receive the engagement feature 32. The retention feature 82 may extend through the cushion 20 and into the opening 22. In the embodiment shown, the retention features are provided on opposite sides of first base axis 66.

The retention clip 40, 60 may be provided with the cushion 20 during the cushion molding process. For example, the retention clips 40, 60 may be positioned in a mold and the cushion material may be injected, molded, and cured around the retention clip 40, 60 to secure the retention clip 40, 60 in a predetermined location in the cushion 20. In addition, a plurality of retention clips 40, 60 may be interconnected or provided as a strip that may be separated into individual clips or a series of clips having a desired quantity or length.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A retention clip for securing a trim cover, comprising:
first and second pads that are spaced apart from each other and disposed on a first base axis, the first and second pads each having a unitary configuration that includes a trim cover retention feature configured as a pair of barbs that extend from a top surface of each of the first and second pads and that do not extend through an opening in the first and second pads;
first and second arms that extend from the first pad at an acute angle with respect to the first base axis, wherein the first and second arms do not extend parallel to each other;
third and fourth arms that extend from the second pad at an acute angle with respect to the first base axis;
a first extension arm that extends substantially linearly from the first arm to the third arm and connects the first arm to the third arm; and
a second extension arm that extends from and connects the second arm to the fourth arm;
wherein the first, second, third, and fourth arms and the first and second extension arms at least partially define at least one opening therebetween that is disposed on the first base axis, the first extension arm is disposed substantially parallel to the second extension arm, and wherein the first and second extension arms do not extend parallel to the first, second and third arms.

2. The retention clip of claim 1 wherein the first and second arms are spaced apart from each other and spaced apart from the first base axis.

3. The retention clip of claim 1 wherein the first extension arm is spaced apart from the second extension arm.

4. The retention clip of claim 1 further comprising a first connecting member that extends from the first extension arm to the second extension arm.

5. The retention clip of claim 4 wherein the first and second arms are spaced apart from the first connecting member.

6. The retention clip of claim 4 further comprising a second connecting member that extends from the first extension arm to the second extension arm, wherein the second connecting member is spaced apart from the first connecting member and spaced apart from the third and fourth arms.

7. The retention clip of claim 6 wherein the first arm, second arm, first extension arm, second extension arm, and first connecting member at least partially define a first base opening.

8. The retention clip of claim 7 wherein the first and second extension arms and first and second connecting members cooperate to define a second base opening.

9. A seat trim cover retention clip, comprising:
first and second pads that are spaced apart from each other and disposed on a first base axis, the first and second pads each having a unitary configuration that includes a retention feature configured as a pair of barbs that extend from a top surface of each of the first and second pads for securing a trim cover, wherein the retention feature does not extend through an opening in the first pad or the second pad;
first and second arms that extend from the first pad toward the second pad, wherein the first and second arms do not extend parallel to each other;
third and fourth arms that extend from the second pad toward the first pad;
a first extension arm that extends from the first arm to the third arm;
a second extension arm that extends linearly from the second arm to the fourth arm, wherein the second extension arm does not extend parallel to the second and fourth arms and the first and second extension arms extend substantially parallel to each other; and
a first connecting member disposed between the first and second pads that extends across the first base axis from the first extension arm to the second extension arm.

10. The retention clip of claim 9 further comprising a second connecting member that is disposed between the first connecting member and the second pad, wherein the second connecting member extends across the first base axis from the first extension arm to the second extension arm.

11. The retention clip of claim 10 wherein the first and second connecting members are bisected by the first base axis.

12. The retention clip of claim 10 wherein the first connecting member is substantially linear and spaced apart from the first and second arms.

13. The retention clip of claim 9 further comprising a second base axis that is disposed substantially perpendicular to the first base axis and that intersects the first base axis within the first pad, wherein the first and second arms are spaced apart from the second base axis.

14. The retention clip of claim 13 wherein the first and second arms each extend from the first pad at an acute angle with respect to the first base axis and the second base axis.

15. The retention clip of claim 9 wherein the first and second arms extend linearly from the first pad.

16. The retention clip of claim 9 wherein the third and fourth arms extend linearly from the second pad.

17. The retention clip of claim 9 wherein the first and second arms are disposed along axes that intersect at a point near a center of the first pad.

18. The retention clip of claim 9 wherein the first and second extension arms are substantially linear.

19. The retention clip of claim 9 wherein the first and second extension arms extend substantially parallel to the first base axis.

20. The retention clip of claim 19 wherein the first and second arms are spaced apart from each other and the third and fourth arms are spaced apart from each other.

* * * * *